United States Patent
Tang et al.

(10) Patent No.: US 6,817,664 B1
(45) Date of Patent: Nov. 16, 2004

(54) AUTOMOBILE SEAT COVER

(76) Inventors: Jan Hao Tang, 3118 80$^{th}$ St., East Elmhurst, NY (US) 11370; Jack Tang, 3118 80$^{th}$ St., East Elmhurst, NY (US) 11370

( * ) Notice: Subject to any disclaimer, the term of this patent is extended or adjusted under 35 U.S.C. 154(b) by 0 days.

(21) Appl. No.: 10/763,829

(22) Filed: Jan. 22, 2004

(51) Int. Cl.$^7$ .............................................. A47C 27/00
(52) U.S. Cl. .................................. 297/229; 297/DIG. 6; 297/219.1; 297/228.1
(58) Field of Search .............................. 297/229, 228.1, 297/219.1, DIG. 6; 5/738, 490, 491

(56) References Cited

U.S. PATENT DOCUMENTS

| | | | | |
|---|---|---|---|---|
| 3,695,690 A | * | 10/1972 | Carson | 297/218.3 |
| 4,232,898 A | | 11/1980 | Bodrero | |
| 4,400,030 A | * | 8/1983 | Maruzzo et al. | 297/228.1 |
| 5,007,676 A | | 4/1991 | Lien | |
| 5,018,790 A | * | 5/1991 | Jay | 297/452.26 |
| 5,023,125 A | * | 6/1991 | Gray | 428/100 |
| 5,028,472 A | | 7/1991 | Gray | |
| 5,234,252 A | * | 8/1993 | Wallach | 297/229 |
| 5,302,001 A | * | 4/1994 | van Dis | 297/228.13 |
| 5,642,917 A | * | 7/1997 | Geiger | 297/219.12 |
| 5,803,539 A | * | 9/1998 | Dewar et al. | 297/228.12 |
| 5,806,925 A | * | 9/1998 | Hanley | 297/229 |
| 6,048,026 A | * | 4/2000 | Barnett et al. | 297/229 |
| 6,135,635 A | * | 10/2000 | Miller et al. | 383/2 |
| 6,241,188 B1 | * | 6/2001 | Simpson et al. | 244/122 R |
| 6,309,017 B1 | | 10/2001 | Middleton | |
| 6,652,026 B2 | | 11/2003 | Toyota et al. | |

* cited by examiner

*Primary Examiner*—Peter M. Cuomo
*Assistant Examiner*—Erika Garrett
(74) *Attorney, Agent, or Firm*—Randal D. Homburg

(57) ABSTRACT

A seat cover for an automobile to be installed over existing automobile seats includes at least two fabric straps having a hook surface, each of the fabric straps being attached to the automobile seat by a lower hook engaging the lower seat frame, an upper hook engaging the headrest supports, and an intermediate retaining bracket which engages each strap and retains it in the fold of the automobile seat located between the seat portion and the back portion of the automobile seat, the straps held against the inner surface of the seat with the hook surface facing outward from the automobile seat, with a lower seat cover covering the seat portion, the lower seat cover having an inner surface having a fabric loop surface which engages the hook surface of each strap, and an upper seat cover covering the back portion, the upper seat cover also having an inner surface having a fabric loop surface which engages the hook surface of each strap, the upper seat cover also having a headrest cover which covers the headrest of the automobile seat, the headrest cover removably attaching to the upper seat cover by a headrest retaining tab made of a fabric hook material.

4 Claims, 5 Drawing Sheets

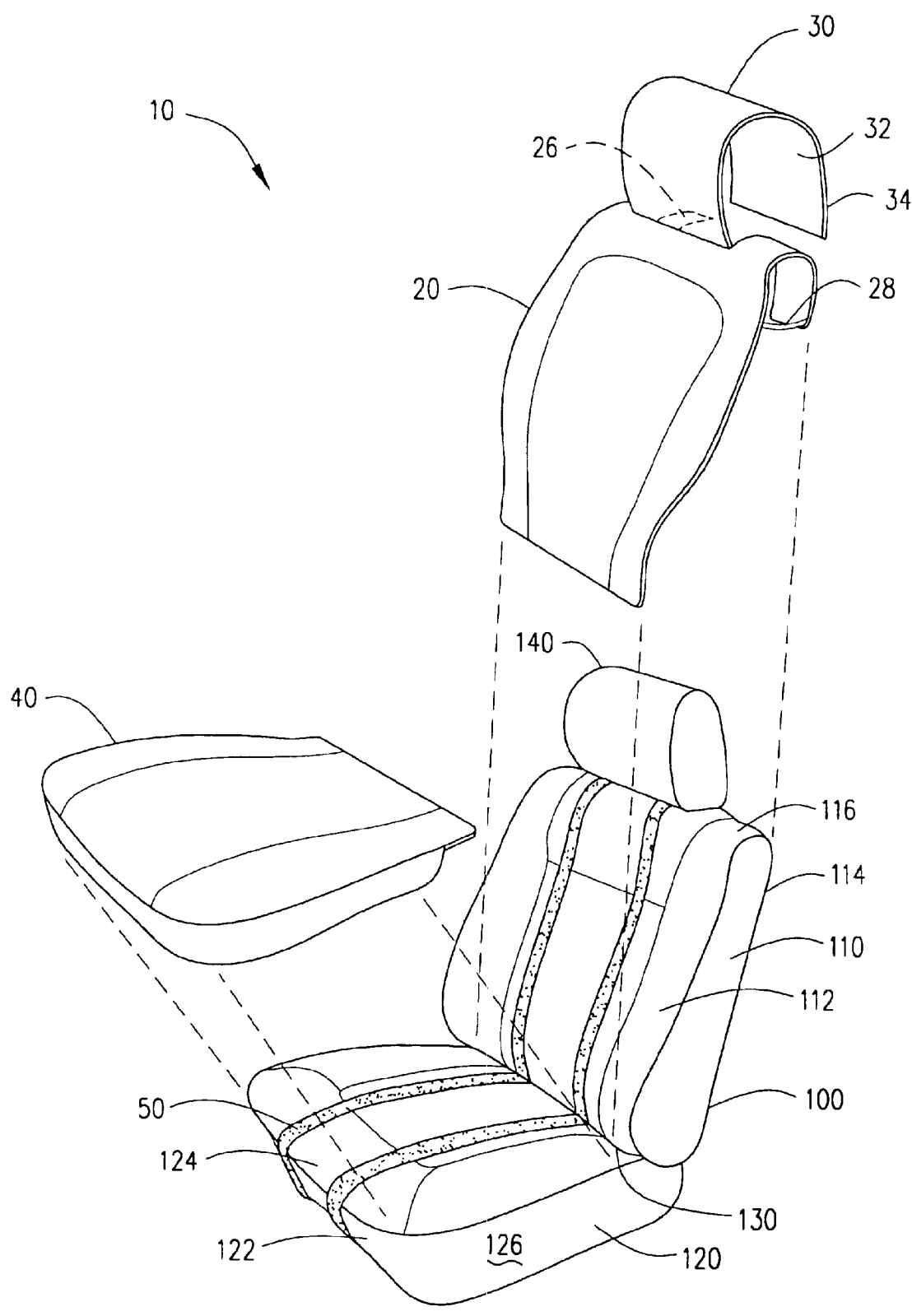
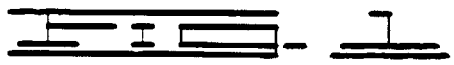

AUTOMOBILE SEAT COVER

CROSS REFERENCE TO RELATED APPLICATIONS

None

BACKGROUND OF THE INVENTION

1. Field of Invention

The seat cover for an automobile to be installed over existing automobile seats includes at least two fabric straps having a hook surface, each of the fabric straps being attached to the automobile seat by a lower hook engaging the lower seat frame, an upper hook engaging the headrest supports, and an intermediate retaining bracket which engages each strap and retains it in the fold of the automobile seat located between the seat portion and the back portion of the automobile seat, the straps held against the inner surface of the seat with the hook surface facing outward from the automobile seat, with a lower seat cover covering the seat portion, the lower seat cover having an inner surface having a fabric loop surface which engages the hook surface of each strap, and an upper seat cover covering the back portion, the upper seat cover also having an inner surface having a fabric loop surface which engages the hook surface of each strap, the upper seat cover also having a headrest cover which covers the headrest of the automobile seat, the headrest cover removably attaching to the upper seat cover by a headrest retaining tab made of a fabric hook material.

2. Description of Prior Art

The following United States patents were discovered and are disclosed within this application for utility patent. All relate to automotive seat covers which are intended to be placed over existing automobile seats.

In U.S. Pat. No. 5,028,472 to Gray, a fastening means for a custom fit seat cover includes a seat cover material having a loop pile fastening structure conforming to the seat to be covered, a plurality of hook pile fastening tabs connected to the seat cover material, the hook pile fastening tabs wrapped around the portion of the seat to be covered with the hook pile fastening tabs fastened to the seat cover whereby the hook pile fastening tabs wrap around the portion of the seat to be covered and are adjustable over the loop pile surface of the seat cover material. The hook material is not provided in straps that attach to the headrest by a first hook, the lower seat frame by a second hook and within the fold of the upper and lower seat portion by a hook, adjusted to tension and attach to the loop material on the back of the seat covers, the straps remaining fastened to the seat when the seat covers are removed.

U.S. Pat. No. 5,803,539 to Dewar discloses a lower seat cover attached to the lower portion of an automobile seat by a lap strap engaging a buckle strap, an upper seat cover attached to the upper portion of an automobile seat by a second lap strap engaging a buckle strap, and a separate headrest cover attaching to a headrest by adhesive strips. The straps are all integrated with the seat covers and are removed with the seat covers. The straps do not remain on the seat when the seat covers are removed for periodic cleaning.

In U.S. Pat. No. 6,652,026 to Toyota, a headrest secured automobile seat cover is disclosed having a contoured seat cover which folds to cover the front of the upper seat portion and top of the lower seat portion of an automobile seat, the attachment to the seat comprising bottom straps, middle straps and top straps. The top straps are either permanently attached to the seat cover or removably attached through respective loops attached to the seat cover the top straps further attached to the seat by either hooks, VELCRO or ball and snap chain attaching to the headrest support bars at the top of the seat the bottom and middle straps are also either permanently attached to the seat cover or placed through loops attached to the seat cover, the opposite ends of those straps either attaching to each other by a buckle, or having hooks attached to the ends which engage some portion of the seat. The seat cover may be removed, but the top, middle and lower straps must be detached from the seat if they are permanently attached, or are left dangling if placed through loops on the seat cover, each strap having to be reattached independently when the seat cover is reapplied.

Other patents reviewed in preparation of this application include U.S. Pat. No. 4,232,898 to Bodrero, U.S. Pat. No. 5,007,676 to Lien, U.S. Pat. No. 5,234,252 to Wallach and U.S. Pat. No. 6,309,017 to Middleton.

SUMMARY OF THE INVENTION

In older vehicles and in some restorations, the automobile seats will wear out to the extent that reupholstery becomes necessary or at least an aesthetic option. This can be costly, and as demonstrated by the abundance of prior art in this area, temporary or removably seat covers my be the most practical option. In the prior art, as noted above, nearly all of the seat covers attach to the seats through straps or fastening materials which are either permanently attached to the seat or are removed when the seat cover is removed. To date, the seat cover and the attaching means have not been presented as truly independent, nor has the attaching means which remains on the seat been presented in a manner not permanently attached to the seat cover by either an adhesive or seam. In addition, if the seat cover is removed for periodic cleaning or a change of taste, the attaching means must be repositioned and reapplied to attach the seat covers back onto the automobile seat. It would be of much convenience to provide the attaching means as completely independent from the seat cover with removal of the seat cover not effecting the attachment of the attaching means to the automobile seat, making reapplication of the seat cover less time consuming and requiring less effort, and also making reapplication more consistent than if the entire attaching means had to be repositioned and completely reapplied.

It is therefore the objective of the present seat cover to provide an upper seat cover with an integrated headrest cover and a lower seat cover with a loop pile material on their inner surfaces and at least two independent elongated straps having an outer surface with a hook pile material, each strap having an upper end attached to an upper hook engaging the headrest support bar, a lower end attached to a lower hook engaging the lower seat portion frame on the underside of the lower seat portion, and an intermediate segment of the strap which is placed through a gap between the upper seat portion and the lower seat portion, the intermediate segment retained through the gap by an intermediate hook. The at least two independent elongated straps are attached to the automobile seat, and then the upper seat cover is attached to the upper seat portion, the loop pile material of the seat cover attaching to the hook pile material on each strap, after which the lower seat cover is attached to the lower seat portion, the loop pile material on the lower seat cover attaching to the hook pile material on each strap. If the seat covers are removed, the straps remain secured to the automobile seat which remain attached, making reapplication of the seat covers a simple process of merely placing the seat covers back on the automobile seats.

A second objective of the present seat cover is to have a headrest cover integrated with the upper seat cover, the headrest cover simply wrapping around the headrest and attaching to a tab on the back surface of the upper seat cover, thereby giving the headrest a uniform upholstered appearance to the remainder of the automobile seat without the need of providing an additional piece of material to have to deal with during installation, the separate headrest covers being the subject matter of several prior art patents.

DESCRIPTION OF THE DRAWINGS

The following drawings are submitted with this utility patent application.

FIG. 1 is an exploded perspective view of the automobile seat cover on an automobile seat.

FIG. 6 is a side cross section showing the automobile seat with the fabric strap engaging the inner surface of the upper and lower seat covers.

DESCRIPTION OF THE PREFERRED EMBODIMENT

Figure 2:
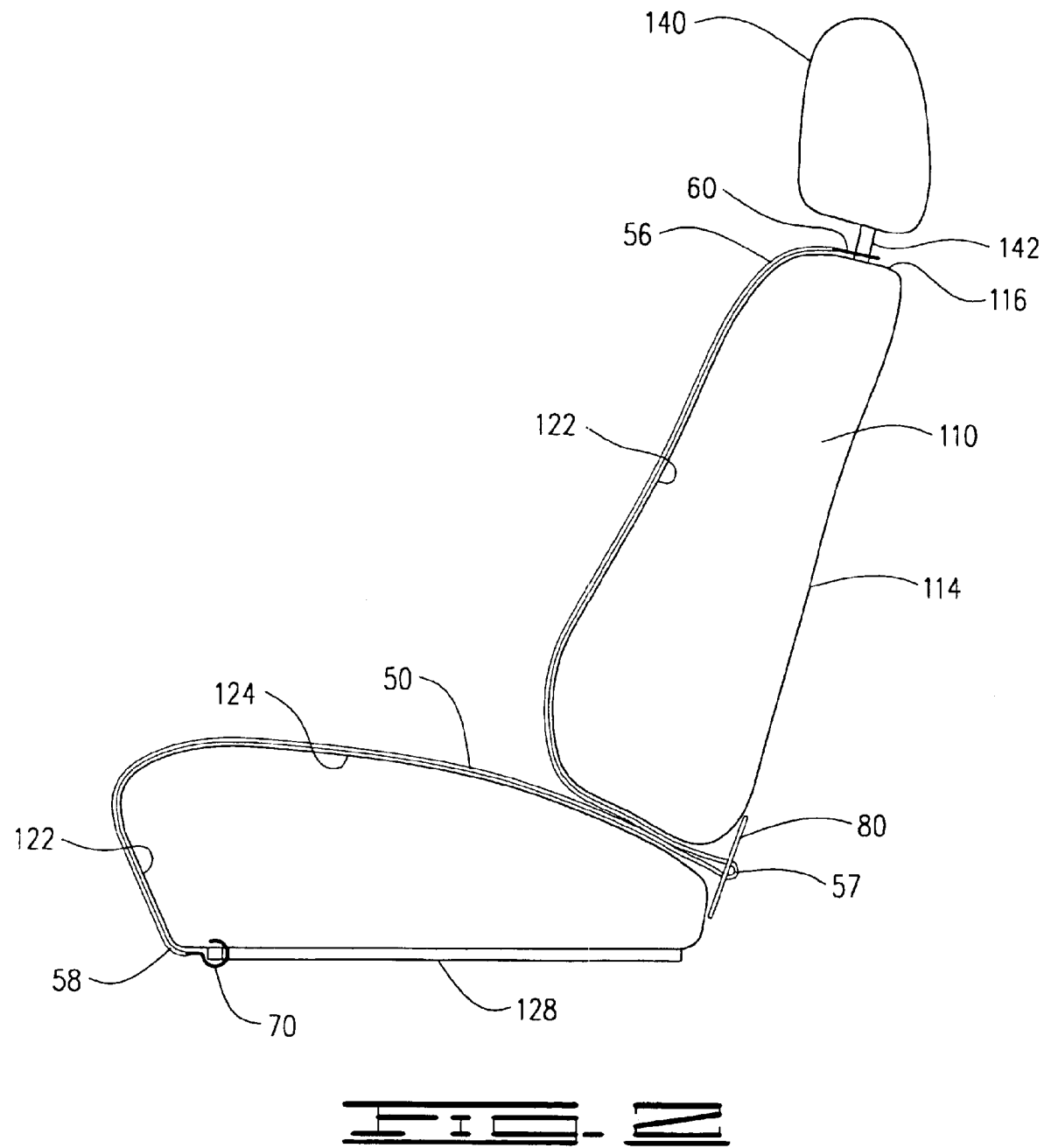
FIG. 2 is a side cross section of the automobile seat cover on an automobile seat.

A seat cover apparatus 10 for placement over an existing automobile seat 100 having an upper seat portion 110, a lower seat portion 120 having a lower seat portion frame 128, a gap 130 between the upper seat portion 110 and lower seat portion 120, and a headrest 140 attached to the upper seat portion 110 by at least one headrest support 142, the apparatus 10, shown in FIGS. 1-7, comprising an upper seat cover 20 having an integrated headrest cover 30 adapted to cover the headrest 140 of the automobile seat 100, the upper seat cover 20 and headrest 30 having respective but common rear surfaces 22, 32 of a loop pile material 24,34 and a headrest attaching tab 26 made of a hook pile material 27, a lower seat cover 40 having a rear surface 42 of a loop pile material 44, the upper seat cover 20 adapted to conform to the upper seat portion 110 of the automobile seat 100 and covering at least a front surface 112, at least a portion of the back surface 114 and a top surface 116 of the upper seat portion 110, the lower seat cover 40 adapted to conform to the lower seat portion 120 of the automobile seat 100 covering at least a front surface 122, top surface 124 and two side surfaces 126 of the lower seat portion 120, and at least two independent elongated straps 50 having an outer surface 52 of a hook pile material 54, each strap 50 having an upper end 56, a lower end 58 and an intermediate segment 57, the upper end 56 attached to an upper hook 60 which further engages the headrest support 142, the lower end 58 attached to a lower hook 70 which further engages the lower seat portion frame 128 and the intermediate segment 57 extending through the gap 130 between the upper seat portion 110 and the lower seat portion 120 and retained within the gap 130 by an intermediate hook 80, wherein the at least two straps 50 are attached to the automobile seat 100 with the outer surface 52 each strap positioned away from the automobile seat 100 using the upper hooks 60, lower hooks 70 and intermediate hooks 80, as indicated in FIGS. 1 and 2, after which the upper seat cover 20 is placed upon the upper seat portion 110, the lower seat cover 40 is placed on the lower seat portion 120 and the headrest cover 30 is wrapped around the headrest 140 and the headrest attaching tab 26 is attached to the rear surface 32 of the headrest cover 30, the hook pile material 54 of the straps 50 and headrest attaching tabs 26 engaging the loop pile material 24, 34, 44 on the rear surfaces 22, 32, 42 of the respective upper seat cover 20, headrest cover 30 and lower seat cover 40 retaining the seat covers 20, 40 on the automobile seat 100.

Figure 3:
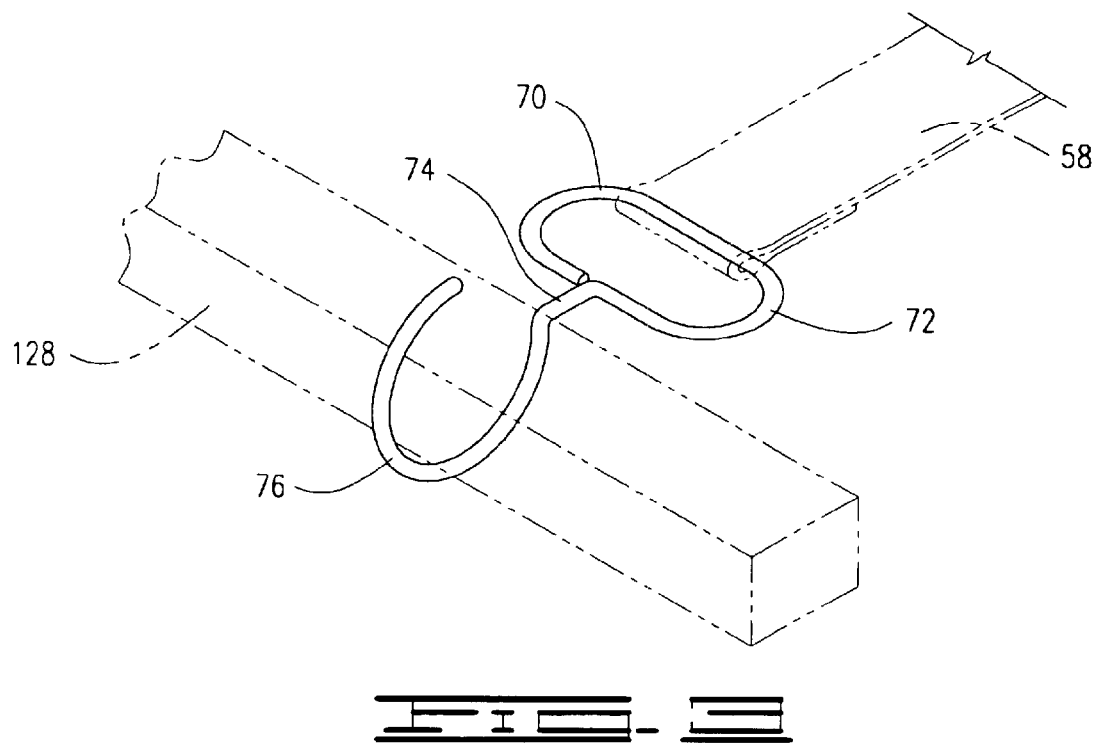
FIG. 3 is a perspective view of the lower hook, with phantom lines indicating the lower seat frame and one of the fabric straps.
Figure 4:
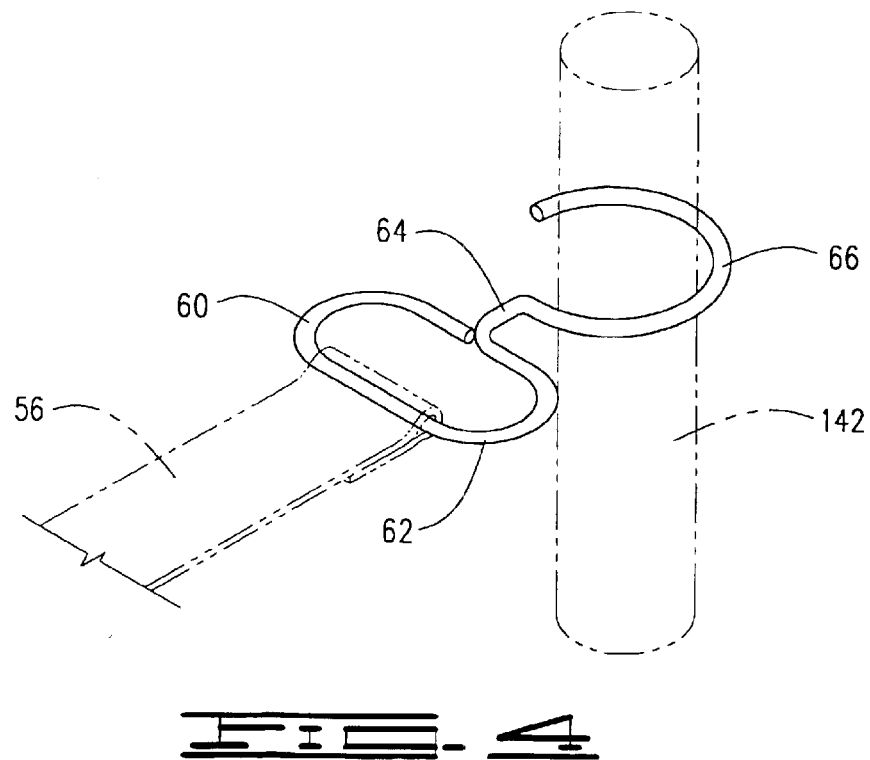
FIG. 4 is a perspective view of the upper seat hook, with phantom line indicating the headrest support and one of the fabric straps.
Figure 4:
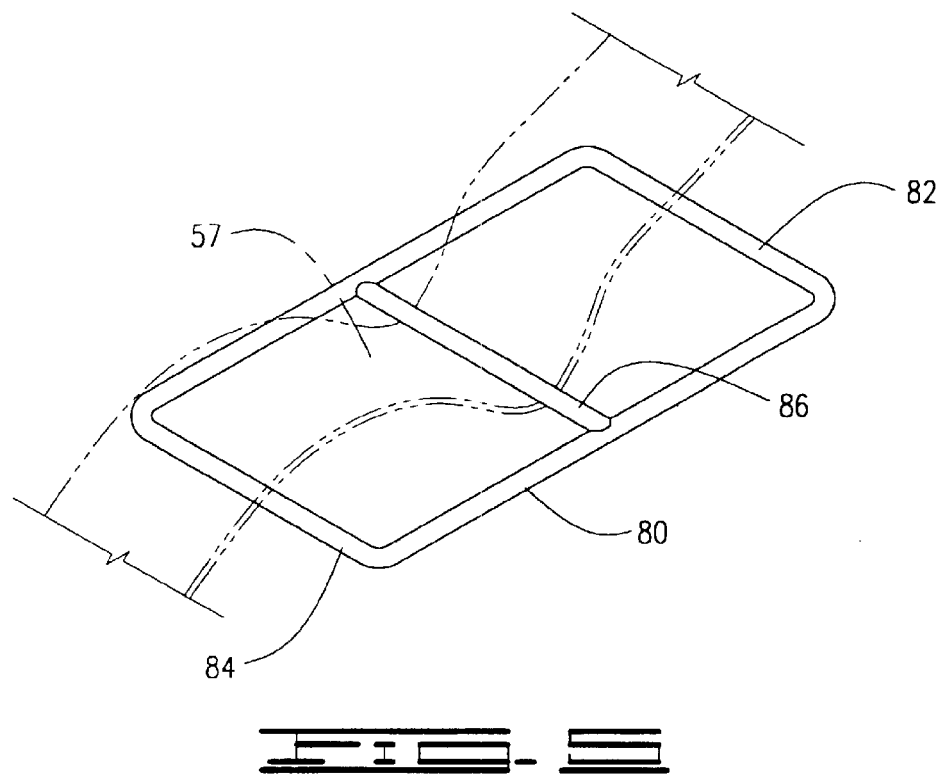

The upper hook 60 is further defined as indicated in FIG. 4 as having a buckle section 62, a neck section 64 and a hook section 66. The upper ends 56 of each of the straps 50 is connected to the buckle section 62 of the upper hooks 60 by looping the upper end 56 of each strap 50 and folding each strap 50 back upon itself. The overlapping strap may thus be adhesively attached to itself. The hook section 66 of the upper hook 60 is attached to the headrest support 142, retaining the upper hook 60 and the attached upper end 56 of the strap 50 to the upper seat portion 110. The lower hook 70 is further defined as indicated in FIG. 3 as having a buckle section 72, a neck section 74 and a hook section 76. The lower ends 58 of each strap 50 are connected to the buckle section 72 of each lower hook 70 by looping the lower end 58 of the strap 50 and folding the strap 50 back upon itself. Again, the overlapping strap may be adhesively attached to itself. The hook section 76 of the lower hook 70 is attached to the lower seat portion frame 128, retaining the lower hook 70 and the attached lower end 58 of each strap 50 to the lower seat portion.

Figure 5:
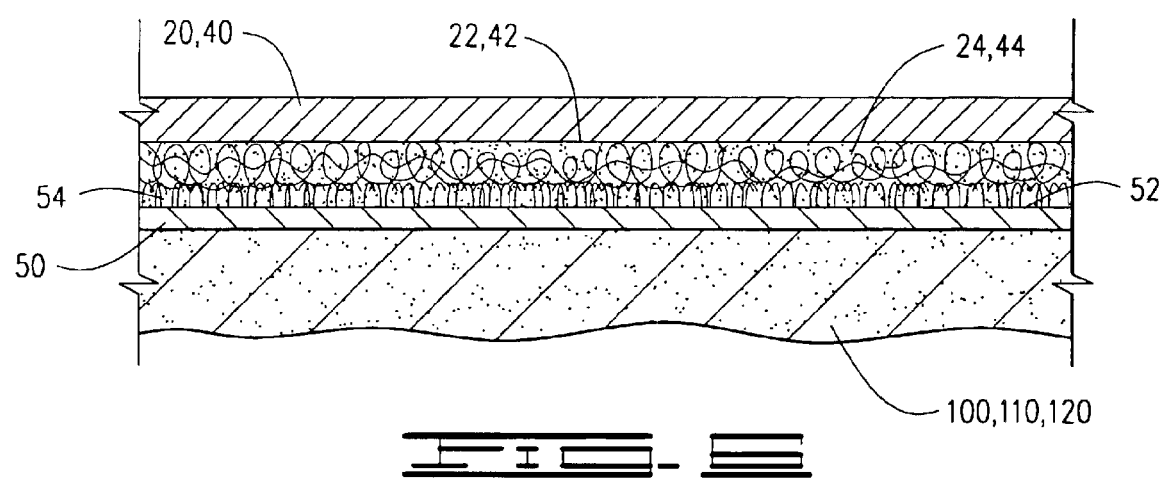
FIG. 5 is a perspective view of the intermediate retaining bracket with phantom lines indicating one of the fabric straps.

The intermediate hook 80, indicated in FIG. 5, has a first buckle section 82, a second buckle section 84 and a cross member 86. The intermediate segment 57 of each strap 50 is retained by the cross member 86 with the strap 50 threaded though the first buckle section 82 and second buckle section 84 over the cross member 86. Preferably, the intermediate hook 80 is attached to the strap 50 prior to the attachment to the upper hook 60 and lower hook 70. The intermediate hook 80 and the intermediate segment 57 of the strap 50 are then inserted through the gap 130 between the upper seat portion 110 and lower seat portion 120 after which the intermediate hook 80 is positioned in a vertical orientation as indicated in FIG. 2 of the drawings to prevent the intermediate hook 80 and attached intermediate segment 57 of the strap 50 from being withdrawn through the gap 130 after insertion, firmly retaining the intermediate hook 80 against the lower seat portion 120 and upper seat portion 110.

FIG. 6 demonstrates a cross section of the automobile seat 100, the strap 50 with the hook pile material 54 directed away from the automobile seat 100 and the loop pile material 24, 44 attached to the inner surface 22, 42 of the seat covers 20, 40 subsequent to application of the seat covers 20, 40 over the attached strap 50 upon the automobile seat 100, FIG. 6 representing the upper seat cover 20 and upper seat portion 110 as well as the lower seat cover 40 and the lower seat portion 120.

Figure 7:
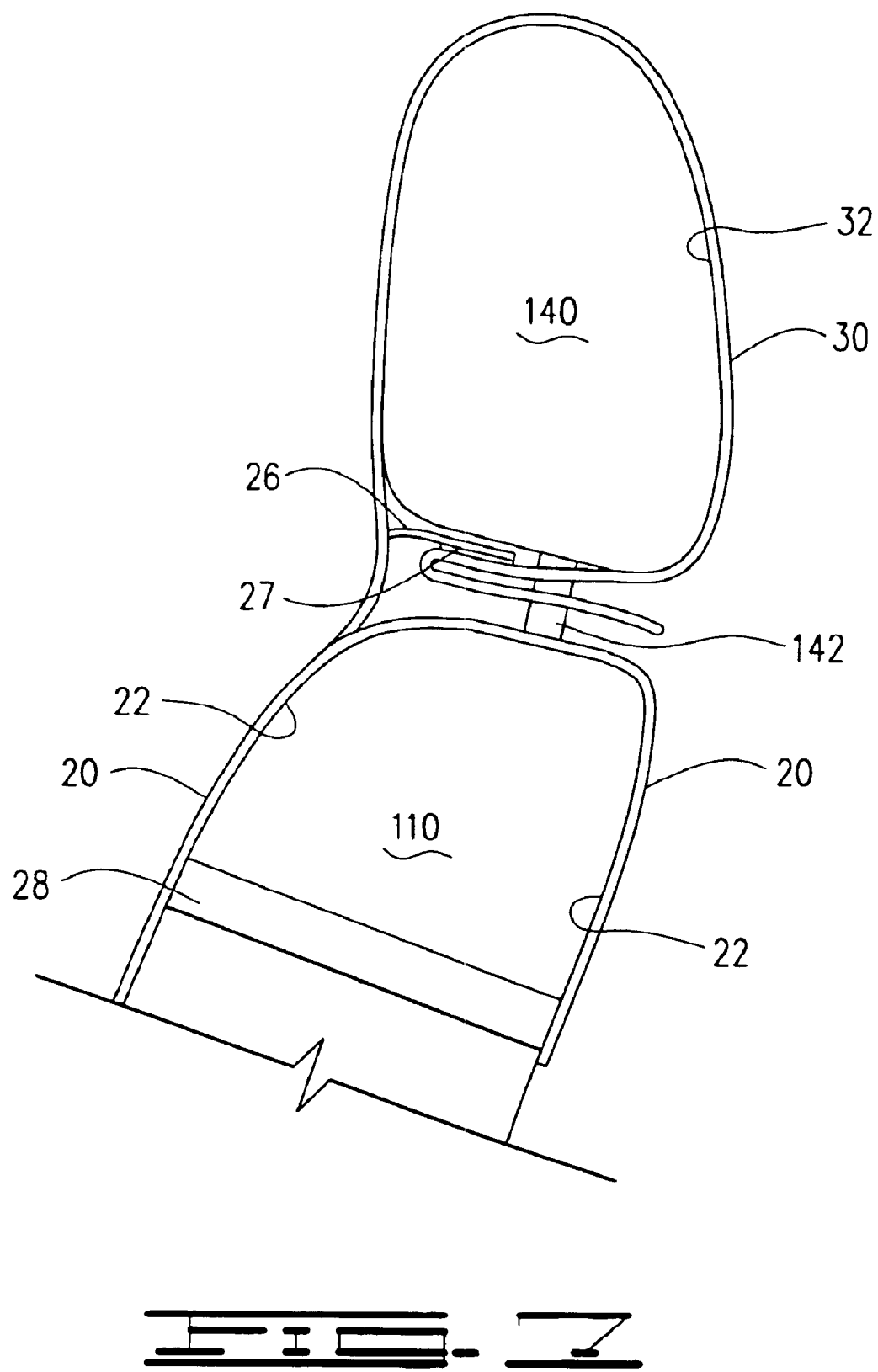
FIG. 7 is a side cross section of the headrest and the headrest cover of the upper seat cover.

The application of the headrest cover 30 to the headrest 140 is demonstrated in FIG. 7 of the drawings. The headrest cover 30 attached to the upper seat cover 20 is wrapped around the headrest 140, the headrest 140 being adjusted to height prior to installation. The inner surface 32 of the headrest cover 30 is then attached to the headrest attaching tab 26 extending from the rear surface 22 of the headrest cover 30, thereby connecting the hook pile material 27 on the headrest attaching tab 28 to the loop pile material 34 on the inner surface 32 of the headrest cover 30.

The upper seat cover 20 may also include an elastic strap 28 which extends across part of the upper seat cover 20 to hold and conform the upper seat cover 20 to the front surface 112, top surface 116 and at least a portion of the back surface 114 of the upper seat portion 110 as demonstrated in FIGS. 1 and 7 of the drawings.

It is also contemplated within the scope of this apparatus that the upper seat cover 110 may be extend to cover the sides of the upper seat portion 110 of the automobile seat 100 as well as the entire back surface 114 of the upper seat portion 110. While not material to the apparatus, the upper and lower seat covers 20, 40 would be most practically presented as made of a moisture impermeable fabric, including leather, synthetic leather, canvas or other treated fabric.

It is also contemplated that the upper end 56 and lower end 58 of the straps may be directly connected the headrest support 142 and lower seat portion frame 128, or be connected with some type of snap connection, buckle, adhesive or other type retaining mean. In addition, the intermediate hook 80 may be presented with slots in the first buckle section 82 and second buckle section 84 which would allow for the intermediate segment 57 of the strap 50 to be inserted through the gap 130, with the intermediate segment 57 of the strap 50 being inserted through the slots to allow application of the intermediate hook 80 after the intermediate segment 57 of the strap 50 is placed through the gap 130 or after the upper and lower hooks 60, 70 are attached to the strap 50.

While the apparatus has been particularly shown and described with reference to a preferred embodiment thereof, it will be understood by those skilled in the art that changes in form and detail may be made therein without departing from the spirit and scope of the invention.

What is claimed is:

1. A seat cover apparatus for placement over an existing automobile seat having an upper seat portion, a lower seat portion having a lower seat portion frame, a gap between the upper seat portion and lower seat portion, and a headrest attached to the upper seat portion supported by at least one headrest support, the apparatus comprising:

an upper seat cover having an integrated headrest cover, said upper seat cover and said headrest cover having a rear surface made of a hook pile material, said headrest cover further having a headrest attaching tab securing said headrest cover around said headrest;

a lower seat cover having a rear surface made of a loop pile material; and at least two elongated straps having an outer surface made of a hook pile material, each said strap having an upper end attached to said headrest support by an upper hook, a lower end attached to said lower seat portion frame by a lower hook and an intermediate segment secured within said gap by an intermediate hook, said hook pile material of said straps removably securing said upper seat cover and said lower seat cover to said automobile seat.

2. A seat cover apparatus for placement over an existing automobile seat having an upper seat portion, a lower seat portion having a lower seat portion frame, a gap between the upper seat portion and lower seat portion, and a headrest attached to the upper seat portion supported by at least one headrest support, the apparatus comprising:

an upper seat cover having an integrated headrest cover adapted to cover said headrest of said automobile seat, said upper seat cover and headrest having rear surfaces having a loop pile material and a headrest attaching tab made of a hook pile material, said upper seat cover adapted to conform to said upper seat portion of said automobile seat covering a front surface, a top surface and a portion of a back surface of said upper seat portion;

a lower seat cover having a rear surface which is a loop pile material, said lower seat cover adapted to conform to said lower seat portion of said automobile seat covering at least a front surface, top surface and two side surfaces of said lower seat portion, and at least two independent elongated straps having an outer surface made of a hook pile material, each strap having an upper end, a lower end and an intermediate segment, said upper end attached to an upper hook which further engages said headrest support, said lower end attached to a lower hook which further engages said lower seat portion frame and said intermediate segment extending through said gap between said upper seat portion and said lower seat portion, said intermediate segment retained within said gap by an intermediate hook, wherein said at least two straps are fixed upon said automobile seat with said outer surface each strap positioned away from said automobile seat using said upper hooks, lower hooks and intermediate hooks, after which said upper seat cover is placed upon said upper seat portion, said lower seat cover is placed on said lower seat portion and said headrest cover is wrapped around said headrest and said headrest attaching tab is attached to said rear surface of said headrest cover, said hook pile material of said straps and headrest attaching tabs adhering said loop pile material on said rear surfaces of said upper seat cover, headrest cover and lower seat cover retaining said seat covers on said automobile seat.

3. The apparatus, as disclosed in claim 2, further comprising:

said upper hook having a buckle section, a neck section and a hook section, with said upper end of said strap connected to said buckle section of said upper hook by looping said upper end of said strap and folding said strap adhesively attaching said upper end of said strap to itself, said hook section of said upper hook attached to said headrest support, retaining said upper hook and said attached upper end of said strap to said upper seat portion;

said lower hook having a buckle section, a neck section and a hook section with said lower end of said strap connected to said buckle section of said lower hook by looping said lower end of said strap and folding said strap adhesively attaching said lower end of said strap to itself, said hook section of said lower hook attached to said lower seat portion frame, retaining said lower hook and said attached lower end of said strap to said lower seat portion; and said intermediate hook having a first buckle section, a second buckle section and a cross member, said intermediate segment of said strap retained by said cross member with said strap threaded though said first buckle section and second buckle section over said cross member prior to said attachment of said upper hook and lower hook to said strap, said intermediate hook and said intermediate segment of said strap inserted through said gap between said upper seat portion and lower seat portion after which said intermediate hook is positioned in a vertical orientation to restrict withdrawal of said intermediate hook from said gap after insertion, firmly retaining said intermediate hook against said lower seat portion and upper seat portion.

4. The apparatus as disclosed in claim 2, wherein said headrest cover attached to said upper seat cover is wrapped around said headrest, said headrest being adjusted to height prior to installation, said inner surface of said headrest further attached to said headrest attaching tab extending from said rear surface of said headrest cover, thereby connecting said hook pile material on said headrest attaching tab to said loop pile material on said inner surface of said headrest cover.

* * * * *